(12) United States Patent
Keith, Jr.

(10) Patent No.: US 12,284,512 B2
(45) Date of Patent: *Apr. 22, 2025

(54) DYNAMIC KEY EXCHANGE FOR MOVING TARGET

(71) Applicant: WINKK, INC, Menlo Park, CA (US)

(72) Inventor: Robert O. Keith, Jr., San Jose, CA (US)

(73) Assignee: Winkk, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,638

(22) Filed: Dec. 4, 2023

(65) Prior Publication Data
US 2024/0121604 A1    Apr. 11, 2024

Related U.S. Application Data

(63) Continuation of application No. 17/339,839, filed on Jun. 4, 2021, now Pat. No. 11,843,943.

(51) Int. Cl.
*H04W 12/0471* (2021.01)
*H04W 12/033* (2021.01)
*H04W 12/06* (2021.01)
*H04W 12/63* (2021.01)

(52) U.S. Cl.
CPC ..... *H04W 12/0471* (2021.01); *H04W 12/033* (2021.01); *H04W 12/06* (2013.01); *H04W 12/63* (2021.01)

(58) Field of Classification Search
CPC ........... H04W 12/0471; H04W 12/033; H04W 12/06; H04W 12/63; H04W 12/03
See application file for complete search history.

(56) References Cited

U.S. PATENT DOCUMENTS

| 5,581,615 | A | 12/1996 | Stern |
| 5,850,444 | A | 12/1998 | Rune |
| 5,987,130 | A | 11/1999 | Chang |
| 6,895,506 | B1 | 5/2005 | Abu-Husein |
| 6,947,943 | B2 | 9/2005 | DeAnna |
| 7,468,927 | B1 | 12/2008 | Battista |

(Continued)

FOREIGN PATENT DOCUMENTS

| CN | 107918790 A | 4/2018 |
| CN | 107924475 A | 4/2018 |

(Continued)

OTHER PUBLICATIONS

Erdem Alkim et al., "Post-Quantum key exchange—a new hope", International Association For Cryptologic Research, vol. 20161116:063839, Nov. 16, 2016, pp. 1-22.

(Continued)

*Primary Examiner* — Benjamin E Lanier
*Assistant Examiner* — Lydia L Noel
(74) *Attorney, Agent, or Firm* — Haverstock & Owens, A Law Corporation

(57) ABSTRACT

Low power devices are able to utilize encryption in communication. Low power devices typically cannot send/receive large amounts of data since sending/receiving more data uses more power. Implementing a key exchange with a small encrypted payload enables secure communication between the devices. A one-way data stream is implemented. The one-way data stream is able to be encrypted. The dynamic key exchange is able to be used for a moving target.

20 Claims, 5 Drawing Sheets

(56) References Cited

U.S. PATENT DOCUMENTS

| | | |
|---|---|---|
| 7,571,320 B2 | 8/2009 | Davis |
| D607,009 S | 12/2009 | McEnaney |
| 7,683,773 B1 | 3/2010 | Goodall |
| D614,192 S | 4/2010 | Takani |
| 7,885,635 B2 | 2/2011 | Laursen |
| 7,925,013 B1 | 4/2011 | Washington |
| 7,992,102 B1 | 8/2011 | De Angelo |
| 7,992,190 B2 | 8/2011 | Mevissen |
| 8,139,581 B1 | 3/2012 | Mraz |
| 8,218,762 B2 | 7/2012 | Itoh |
| 8,363,259 B2 | 1/2013 | Gillboa |
| 8,417,642 B2 | 4/2013 | Oren |
| 8,417,643 B2 | 4/2013 | Mardikar |
| 8,543,834 B1 | 9/2013 | Barra |
| 8,543,884 B2 | 9/2013 | Mansour |
| 8,621,209 B1 | 12/2013 | Johansson |
| 8,639,785 B2 | 1/2014 | Kiley |
| 8,892,871 B2 | 11/2014 | Cho |
| D719,176 S | 12/2014 | Cohen |
| D719,177 S | 12/2014 | Cohen |
| D723,050 S | 2/2015 | Minsung et al. |
| 8,959,579 B2 | 2/2015 | Barton |
| 9,112,835 B2 | 8/2015 | Izozaki |
| 9,210,156 B1 | 12/2015 | Little |
| 9,219,732 B2 | 12/2015 | Baghdassaryan |
| 9,225,695 B1 | 12/2015 | Riera |
| 9,350,539 B2 | 5/2016 | Veugen |
| 9,392,460 B1 | 7/2016 | Blake |
| 9,419,951 B1 | 8/2016 | Felsher et al. |
| D765,669 S | 9/2016 | Shaw |
| 9,485,237 B1 | 11/2016 | Johansson |
| 9,615,066 B1 | 4/2017 | Tran |
| 9,665,169 B1 | 5/2017 | Dai |
| 9,706,406 B1 | 7/2017 | Adams |
| 9,721,080 B2 | 8/2017 | Moran |
| D800,764 S | 10/2017 | Thoreson |
| 9,854,218 B2 | 12/2017 | Mardikar |
| D813,884 S | 3/2018 | Penker |
| 9,959,694 B2 | 5/2018 | Lindsay |
| 9,961,547 B1 | 5/2018 | Molina-Markham |
| 10,019,561 B1 | 7/2018 | Shelton |
| 10,200,364 B1 | 2/2019 | Ketharaju et al. |
| 10,257,229 B1 | 4/2019 | Kuo |
| D847,857 S | 5/2019 | Elatta |
| 10,374,800 B1 | 8/2019 | Sharfi |
| 10,380,333 B1 | 8/2019 | Moran |
| 10,402,800 B2 | 9/2019 | Lucas |
| 10,404,458 B1 | 9/2019 | Yamada |
| 10,430,789 B1 | 10/2019 | Herald, Jr. |
| 10,432,605 B1 | 10/2019 | Lester |
| 10,437,975 B1 | 10/2019 | Shelton |
| 10,521,223 B1 | 12/2019 | Bogushefsky, III |
| 10,559,307 B1 | 2/2020 | Khalegi |
| 10,630,467 B1 | 4/2020 | Gilbert |
| 10,674,446 B1 | 6/2020 | Trent |
| 10,762,406 B2 | 9/2020 | Cash |
| 10,769,633 B2 | 9/2020 | Dua |
| 10,810,290 B2 | 10/2020 | Minter et al. |
| 10,867,021 B1 | 12/2020 | Shelton |
| 10,887,307 B1 | 1/2021 | Newstadt |
| 10,911,425 B1 | 2/2021 | Hitchcock |
| 10,936,744 B1 | 3/2021 | Trepetin |
| 10,958,424 B1 | 3/2021 | Chhabra |
| D916,890 S | 4/2021 | Nagpal |
| 10,970,607 B2 | 4/2021 | Xue |
| 11,005,839 B1 | 5/2021 | Shahidzadeh |
| 11,030,618 B1 | 6/2021 | Budko |
| 11,038,694 B1 | 6/2021 | Kleinman |
| D925,602 S | 7/2021 | Xu |
| D928,803 S | 8/2021 | Faller |
| D928,820 S | 8/2021 | Bodduluri |
| 11,121,878 B2 | 9/2021 | McCarty |
| D942,469 S | 2/2022 | Abdullah et al. |
| 11,283,835 B1 | 3/2022 | Gordon |
| 11,328,042 B2 | 5/2022 | Keith, Jr. |
| 11,510,172 B1 | 11/2022 | Feng |
| 11,553,337 B2 | 1/2023 | Keith, Jr |
| 11,563,582 B2 | 1/2023 | Keith, Jr |
| 11,574,045 B2 | 2/2023 | Keith, Jr. |
| 11,588,794 B2 | 2/2023 | Keith, Jr. |
| 11,637,694 B2 | 4/2023 | Islamov |
| 1,164,062 A1 | 5/2023 | Rudko |
| 11,652,815 B2 | 5/2023 | Keith, Jr. |
| 11,657,140 B2 | 5/2023 | Keith, Jr. |
| 2002/0099955 A1 | 7/2002 | Peled et al. |
| 2002/0114454 A1 | 8/2002 | Hamilton |
| 2002/0131592 A1 | 9/2002 | Hinnant |
| 2002/0169871 A1 | 11/2002 | Cravo de Almeida |
| 2002/0186688 A1 | 12/2002 | Inoue |
| 2003/0014750 A1 | 1/2003 | Kamen |
| 2003/0016844 A1 | 1/2003 | Numaoka |
| 2003/0021416 A1 | 1/2003 | Brown |
| 2003/0147267 A1 | 8/2003 | Huttunen |
| 2003/0174067 A1 | 9/2003 | Soliman |
| 2003/0221030 A1 | 11/2003 | Pontius |
| 2004/0198392 A1 | 10/2004 | Harvey |
| 2004/0223616 A1 | 11/2004 | Kocarev |
| 2005/0084114 A1 | 4/2005 | Jung |
| 2005/0135609 A1 | 6/2005 | Lee |
| 2005/0147240 A1 | 7/2005 | Agrawal |
| 2006/0075060 A1 | 4/2006 | Clark |
| 2006/0031301 A1 | 9/2006 | Herz et al. |
| 2006/0196950 A1 | 9/2006 | Killcote |
| 2006/0236408 A1 | 10/2006 | Yan |
| 2006/0285544 A1 | 12/2006 | Taylor |
| 2007/0086653 A1 | 4/2007 | Javidi |
| 2008/0022141 A1 | 1/2008 | Hammarlund |
| 2008/0031460 A1 | 2/2008 | Brookner |
| 2008/0045218 A1 | 2/2008 | Okochi |
| 2008/0084836 A1 | 4/2008 | Baird |
| 2008/0165937 A1 | 7/2008 | Moore |
| 2008/0301057 A1 | 12/2008 | Oren |
| 2009/0006796 A1 | 1/2009 | Chang |
| 2009/0090577 A1 | 4/2009 | Takahashi |
| 2009/0161873 A1 | 6/2009 | Simard |
| 2009/0194592 A1 | 8/2009 | Ming et al. |
| 2009/0279693 A1 | 11/2009 | Billet |
| 2009/0315671 A1 | 12/2009 | Gocho |
| 2009/0327746 A1 | 12/2009 | Greco |
| 2010/0079591 A1 | 4/2010 | Lee |
| 2010/0100716 A1 | 5/2010 | Scott |
| 2010/0122274 A1 | 5/2010 | Gillies |
| 2010/0329232 A1 | 12/2010 | Tubb |
| 2011/0072142 A1 | 3/2011 | Herz et al. |
| 2011/0106935 A1 | 5/2011 | Srinivasan |
| 2011/0167255 A1 | 7/2011 | Matzkel |
| 2011/0167273 A1 | 7/2011 | Maas |
| 2011/0187642 A1 | 8/2011 | Faith |
| 2011/0194694 A1 | 8/2011 | Struik |
| 2011/0231673 A1 | 9/2011 | Alekseev |
| 2011/0233284 A1 | 9/2011 | Howard |
| 2011/0276952 A1 | 11/2011 | Tyloch |
| 2011/0302405 A1 | 12/2011 | Marlow |
| 2011/0321052 A1 | 12/2011 | Long |
| 2012/0047563 A1 | 2/2012 | Wheeler |
| 2012/0098750 A1 | 4/2012 | Allen |
| 2012/0185910 A1 | 7/2012 | Miettinen |
| 2012/0214442 A1 | 8/2012 | Crawford |
| 2012/0221859 A1 | 8/2012 | Marien |
| 2012/0272058 A1 | 10/2012 | Wang et al. |
| 2012/0281885 A1 | 11/2012 | Syrdal |
| 2013/0086625 A1 | 4/2013 | Driscoll |
| 2013/0111208 A1 | 5/2013 | Sabin et al. |
| 2013/0170363 A1 | 7/2013 | Millington |
| 2013/0177151 A1 | 7/2013 | Sella |
| 2013/0185779 A1 | 7/2013 | Tamai |
| 2013/0202104 A1 | 8/2013 | Ghouti |
| 2013/0205410 A1 | 8/2013 | Sambamurthy |
| 2013/0239191 A1 | 9/2013 | Bostick |
| 2013/0243187 A1 | 9/2013 | Hortsmeyer |
| 2013/0304676 A1 | 11/2013 | Gupta |
| 2013/0305324 A1 | 11/2013 | Alford, Jr. |
| 2013/0346023 A1 | 12/2013 | Novo |
| 2014/0002481 A1 | 1/2014 | Broughton |

(56) References Cited

U.S. PATENT DOCUMENTS

| | | |
|---|---|---|
| 2014/0007048 A1 | 1/2014 | Qureshi |
| 2014/0013422 A1 | 1/2014 | Janus |
| 2014/0038583 A1 | 2/2014 | Berg |
| 2014/0039892 A1 | 2/2014 | Mills |
| 2014/0040628 A1 | 2/2014 | Fort et al. |
| 2014/0053261 A1 | 2/2014 | Gupta |
| 2014/0064166 A1 | 3/2014 | HomChadhuri |
| 2014/0098723 A1 | 4/2014 | Battista |
| 2014/0108803 A1 | 4/2014 | Probert |
| 2014/0201531 A1 | 7/2014 | Toy |
| 2014/0215222 A1 | 7/2014 | Sakumoto |
| 2014/0244514 A1 | 8/2014 | Rodriguez |
| 2014/0244515 A1 | 8/2014 | Garfinkle |
| 2014/0250496 A1 | 9/2014 | Amidon |
| 2014/0278077 A1 | 9/2014 | Levin |
| 2014/0304371 A1 | 10/2014 | Mraz |
| 2014/0344455 A1 | 11/2014 | Cheng |
| 2014/0351618 A1 | 11/2014 | Connell |
| 2014/0368601 A1 | 12/2014 | deCharms |
| 2015/0089568 A1 | 3/2015 | Sprague |
| 2015/0095352 A1 | 4/2015 | Lacey |
| 2015/0095580 A1 | 4/2015 | Liu |
| 2015/0095648 A1 | 4/2015 | Nix |
| 2015/0095986 A1 | 4/2015 | Karpey |
| 2015/0103136 A1 | 4/2015 | Anderson |
| 2015/0121524 A1 | 4/2015 | Fawaz |
| 2015/0134963 A1 | 5/2015 | Izu |
| 2015/0142666 A1 | 5/2015 | Landrok |
| 2015/0223731 A1 | 8/2015 | Sahin |
| 2015/0242601 A1 | 8/2015 | Griffiths |
| 2015/0242605 A1 | 8/2015 | Du |
| 2015/0258892 A1 | 9/2015 | Wu |
| 2015/0262067 A1 | 9/2015 | Sridhara |
| 2015/0271679 A1 | 9/2015 | Park |
| 2015/0278805 A1 | 10/2015 | Spencer, III |
| 2015/0280911 A1 | 10/2015 | Andoni |
| 2015/0294092 A1 | 10/2015 | Balasubramanian |
| 2015/0347734 A1 | 12/2015 | Beigi |
| 2015/0350201 A1 | 12/2015 | Cornell |
| 2015/0356289 A1 | 12/2015 | Brown |
| 2015/0356462 A1 | 12/2015 | Fawaz |
| 2015/0365229 A1 | 12/2015 | Patey |
| 2015/0365235 A1 | 12/2015 | Hostyn |
| 2015/0370826 A1 | 12/2015 | Mraz |
| 2015/0373007 A1 | 12/2015 | Sheller |
| 2015/0379238 A1 | 12/2015 | Connor |
| 2016/0007288 A1 | 1/2016 | Samardzija |
| 2016/0011224 A1 | 1/2016 | Pollack |
| 2016/0055327 A1 | 2/2016 | Moran |
| 2016/0057623 A1 | 2/2016 | Dutt |
| 2016/0063492 A1 | 3/2016 | Kobres |
| 2016/0065558 A1 | 3/2016 | Suresh |
| 2016/0065570 A1 | 3/2016 | Spencer |
| 2016/0098334 A1 | 4/2016 | Hariharakrishnan |
| 2016/0103996 A1 | 4/2016 | Salajegheh |
| 2016/0110528 A1 | 4/2016 | Gupta |
| 2016/0117673 A1 | 4/2016 | Landrock |
| 2016/0135107 A1 | 5/2016 | Hampel |
| 2016/0180078 A1 | 6/2016 | Chhabra |
| 2016/0182503 A1 | 6/2016 | Cheng |
| 2016/0191499 A1 | 6/2016 | Momchillov |
| 2016/0283406 A1 | 6/2016 | Linga |
| 2016/0227411 A1 | 8/2016 | Lundblade |
| 2016/0239649 A1 | 8/2016 | Zhao |
| 2016/0239657 A1 | 8/2016 | Loughlin-McHugh et al. |
| 2016/0253498 A1 | 9/2016 | Valencia |
| 2016/0300049 A1 | 10/2016 | Guedalia |
| 2016/0320831 A1 | 11/2016 | McCubbin |
| 2016/0342873 A1 | 11/2016 | Winkk et al. |
| 2016/0352696 A1 | 12/2016 | Essigmann |
| 2017/0005995 A1 | 1/2017 | Yang |
| 2017/0013453 A1 | 1/2017 | Lee |
| 2017/0024660 A1 | 1/2017 | Chen |
| 2017/0041309 A1 | 2/2017 | Ekambaram et al. |
| 2017/0048062 A1 | 2/2017 | Polak |
| 2017/0063528 A1 | 3/2017 | Seo |
| 2017/0068994 A1 | 3/2017 | Slomkowski |
| 2017/0070340 A1 | 3/2017 | Hibshoosh |
| 2017/0070890 A1 | 3/2017 | Luff |
| 2017/0085382 A1 | 3/2017 | Kamakari |
| 2017/0124385 A1 | 5/2017 | Ganong |
| 2017/0134372 A1 | 5/2017 | Dube |
| 2017/0147345 A1 | 5/2017 | Clevenger |
| 2017/0193211 A1 | 7/2017 | Blake |
| 2017/0214529 A1 | 7/2017 | Oliveira |
| 2017/0220407 A1 | 8/2017 | Estrada |
| 2017/0230172 A1 | 8/2017 | Andersson |
| 2017/0230344 A1 | 8/2017 | Dhar |
| 2017/0264597 A1 | 9/2017 | Pizot |
| 2017/0272419 A1 | 9/2017 | Kumar |
| 2017/0289168 A1 | 10/2017 | Bar |
| 2017/0295010 A1 | 10/2017 | Shibutani |
| 2017/0310479 A1 | 10/2017 | Sato |
| 2017/0311250 A1 | 10/2017 | Rico Alvarino |
| 2017/0317823 A1 | 11/2017 | Gandhi |
| 2017/0339118 A1 | 11/2017 | Hwang |
| 2017/0366514 A1 | 12/2017 | Malka |
| 2018/0005239 A1 | 1/2018 | Schlesinger |
| 2018/0005465 A1 | 1/2018 | Truong |
| 2018/0007530 A1 | 1/2018 | Tanaka |
| 2018/0012003 A1 | 1/2018 | Asulin |
| 2018/0025135 A1 | 1/2018 | Odom |
| 2018/0027411 A1 | 1/2018 | Taneja |
| 2018/0029560 A1 | 2/2018 | Mohaupt |
| 2018/0039990 A1 | 2/2018 | Lindermann |
| 2018/0046803 A1 | 2/2018 | Li |
| 2018/0063784 A1 | 3/2018 | Abraham |
| 2018/0109696 A1 | 4/2018 | Thanigasalam |
| 2018/0114221 A1 | 4/2018 | Karantzis |
| 2018/0135815 A1 | 5/2018 | Rowles |
| 2018/0144615 A1 | 5/2018 | Kinney |
| 2018/0150622 A1 | 5/2018 | Zaitsev |
| 2018/0167816 A1 | 6/2018 | Kusens et al. |
| 2018/0189160 A1 | 7/2018 | Yasin |
| 2018/0189161 A1 | 7/2018 | Yasin |
| 2018/0212770 A1 | 7/2018 | Costa |
| 2018/0248865 A1 | 8/2018 | Johansson |
| 2018/0285879 A1 | 10/2018 | Gadnis |
| 2018/0302416 A1 | 10/2018 | Einberg |
| 2018/0322266 A1 | 11/2018 | Kwok Suzuki |
| 2018/0329857 A1 | 11/2018 | Ko |
| 2018/0375848 A1 | 12/2018 | Tunnell |
| 2019/0021001 A1 | 1/2019 | Park |
| 2019/0103957 A1 | 4/2019 | Isobe |
| 2019/0122024 A1 | 4/2019 | Schwartz |
| 2019/0149333 A1 | 5/2019 | Harnik |
| 2019/0188111 A1 | 6/2019 | Ozog |
| 2019/0289017 A1 | 6/2019 | Agarwal |
| 2019/0207918 A1 | 7/2019 | Kurian |
| 2019/0220583 A1 | 7/2019 | Douglas |
| 2019/0245704 A1 | 8/2019 | Pala |
| 2019/0268774 A1 | 8/2019 | Kusens et al. |
| 2019/0271349 A1 | 9/2019 | Madru |
| 2019/0271578 A1 | 9/2019 | Moeller |
| 2019/0272495 A1 | 9/2019 | Moeller |
| 2019/0278895 A1 | 9/2019 | Streit |
| 2019/0279204 A1 | 9/2019 | Norton |
| 2019/0280868 A1 | 9/2019 | Streit |
| 2019/0281025 A1 | 9/2019 | Harriman |
| 2019/0281036 A1 | 9/2019 | Eisen |
| 2019/0287427 A1 | 9/2019 | Schepers |
| 2019/0318122 A1 | 10/2019 | Hockey |
| 2019/0334708 A1 | 10/2019 | Carpor |
| 2019/0342092 A1 | 11/2019 | Handschuh |
| 2019/0354660 A1 | 11/2019 | Fong |
| 2019/0354787 A1 | 11/2019 | Fong |
| 2019/0370445 A1 | 12/2019 | Fong |
| 2019/0386814 A1 | 12/2019 | Ahmed |
| 2019/0391895 A1 | 12/2019 | Della Corte |
| 2020/0014541 A1 | 1/2020 | Streit |
| 2020/0029214 A1 | 1/2020 | Aylward |
| 2020/0042723 A1 | 2/2020 | Krishnamoorthy |
| 2020/0044852 A1 | 2/2020 | Streit |
| 2020/0050745 A1 | 2/2020 | Kim |

(56) References Cited

U.S. PATENT DOCUMENTS

| | | |
|---|---|---|
| 2020/0053096 A1 | 2/2020 | Bendersky |
| 2020/0066071 A1 | 2/2020 | Budman |
| 2020/0097643 A1 | 3/2020 | Uzun |
| 2020/0099675 A1 | 3/2020 | Mardkis |
| 2020/0100115 A1 | 3/2020 | Skaaksrud |
| 2020/0120071 A1 | 4/2020 | Wimmer |
| 2020/0125704 A1 | 4/2020 | Chavez |
| 2020/0127974 A1 | 4/2020 | Moralndo |
| 2020/0133373 A1 | 4/2020 | Huang |
| 2020/0134145 A1 | 4/2020 | Bapst |
| 2020/0162435 A1 | 5/2020 | Kubo |
| 2020/0175157 A1 | 6/2020 | Wilding |
| 2020/0193051 A1 | 6/2020 | Van Antwerp |
| 2020/0242417 A1 | 7/2020 | Sagi |
| 2020/0358611 A1 | 11/2020 | Hoang |
| 2020/0358787 A1 | 11/2020 | Barker |
| 2020/0387696 A1 | 12/2020 | Kushwah |
| 2020/0403787 A1 | 12/2020 | Islam |
| 2020/0403992 A1 | 12/2020 | Huffman |
| 2021/0005224 A1 | 1/2021 | Rothschild |
| 2021/0014314 A1 | 1/2021 | Yamada |
| 2021/0049032 A1 | 2/2021 | White |
| 2021/0051015 A1 | 2/2021 | Widmann |
| 2021/0051177 A1 | 2/2021 | White |
| 2021/0096826 A1 | 4/2021 | Duggal |
| 2021/0123835 A1 | 4/2021 | Glennon |
| 2021/0152417 A1 | 5/2021 | Baird |
| 2021/0152554 A1 | 5/2021 | Taft |
| 2021/0157291 A1 | 5/2021 | Uchizawa |
| 2021/0167946 A1 | 6/2021 | Bitan |
| 2021/0173906 A1 | 6/2021 | Keith, Jr. |
| 2021/0173907 A1 | 6/2021 | Keith, Jr. |
| 2021/0173914 A1 | 6/2021 | Keith, Jr. |
| 2021/0173915 A1 | 6/2021 | Keith, Jr. |
| 2021/0173949 A1 | 6/2021 | Keith, Jr. |
| 2021/0174333 A1 | 6/2021 | Keith, Jr. |
| 2021/0176064 A1 | 6/2021 | Keith, Jr. |
| 2021/0176066 A1 | 6/2021 | Keith, Jr. |
| 2021/0176218 A1 | 6/2021 | Keith, Jr. |
| 2021/0176223 A1 | 6/2021 | Falk |
| 2021/0176235 A1 | 6/2021 | Keith, Jr. |
| 2021/0176633 A1 | 6/2021 | Keith, Jr. |
| 2021/0194608 A1 | 6/2021 | Yao |
| 2021/0200852 A1 | 7/2021 | Gupta |
| 2021/0250759 A1 | 8/2021 | Ziv |
| 2021/0297258 A1 | 9/2021 | Keith, Jr. |
| 2021/0297448 A1 | 9/2021 | Keith, Jr. |
| 2021/0297455 A1 | 9/2021 | Keith, Jr. |
| 2021/0350918 A1 | 11/2021 | Paul |
| 2021/0362750 A1 | 11/2021 | Yang |
| 2021/0390537 A1 | 12/2021 | Budko et al. |
| 2022/0027439 A1 | 1/2022 | Greenberger |
| 2022/0027447 A1 | 1/2022 | Keith, Jr. |
| 2022/0028200 A1 | 1/2022 | Keith, Jr. |
| 2022/0030022 A1 | 1/2022 | Keith, Jr. |
| 2022/0036905 A1 | 2/2022 | Keith, Jr. |
| 2022/0038895 A1 | 2/2022 | Keith, Jr. |
| 2022/0038897 A1 | 2/2022 | Liu |
| 2022/0043913 A1 | 2/2022 | Keith, Jr. |
| 2022/0045841 A1 | 2/2022 | Keith, Jr. |
| 2022/0092161 A1 | 3/2022 | Keith, Jr. |
| 2022/0092162 A1 | 3/2022 | Keith, Jr. |
| 2022/0092163 A1 | 3/2022 | Keith, Jr. |
| 2022/0092164 A1 | 3/2022 | Keith, Jr. |
| 2022/0092165 A1 | 3/2022 | Keith, Jr. |
| 2022/0093256 A1 | 3/2022 | Keith, Jr. |
| 2022/0094545 A1 | 3/2022 | Islamov et al. |
| 2022/0094550 A1 | 3/2022 | Keith, Jr. |
| 2022/0108026 A1 | 4/2022 | Ortiz et al. |
| 2022/0130501 A1 | 4/2022 | Keith, Jr. |
| 2022/0138300 A1 | 5/2022 | Manjunath et al. |
| 2022/0139546 A1 | 5/2022 | Manjunath et al. |
| 2022/0164424 A1 | 5/2022 | Keith, Jr. |
| 2022/0197985 A1 | 6/2022 | Keith, Jr. |
| 2022/0200971 A1 | 6/2022 | Vigneswaran |
| 2022/0229888 A1 | 7/2022 | Keith, Jr. |
| 2022/0286966 A1 | 9/2022 | Zhao |
| 2022/0382844 A1 | 12/2022 | Keith, Jr. |
| 2022/0385458 A1 | 12/2022 | Keith, Jr. |
| 2022/0394023 A1 | 12/2022 | Keith, Jr. |
| 2022/0394464 A1 | 12/2022 | Keith, Jr. |
| 2022/0394465 A1 | 12/2022 | Keith, Jr. |
| 2023/0096233 A1 | 3/2023 | Islamov et al. |
| 2023/0106024 A1 | 4/2023 | Keith, Jr. |
| 2023/0107624 A1 | 4/2023 | Keith, Jr. |
| 2023/0114650 A1 | 4/2023 | Keith, Jr. |
| 2023/0116527 A1 | 4/2023 | Keith, Jr. |
| 2023/0185896 A1 | 6/2023 | Keith, Jr. |
| 2023/0198766 A1 | 6/2023 | Keith, Jr. |
| 2023/0198962 A1 | 6/2023 | Keith, Jr. |
| 2023/0254120 A1 | 8/2023 | Islamov |
| 2023/0254121 A1 | 8/2023 | Islamov |
| 2023/0254122 A1 | 8/2023 | Islamov |
| 2023/0267454 A1 | 8/2023 | Budko |
| 2023/0283602 A1 | 9/2023 | Keith, Jr. |
| 2023/0289431 A1 | 9/2023 | Keith, Jr. |

FOREIGN PATENT DOCUMENTS

| | | |
|---|---|---|
| CN | 106413128 B | 7/2020 |
| EP | 3276561 A | 1/2018 |
| EP | 3457344 A1 | 3/2019 |
| WO | WO2009060004 A1 | 5/2009 |
| WO | WO2009066004 A1 | 5/2009 |
| WO | 2016179433 A1 | 11/2016 |
| WO | 2020065132 A1 | 4/2020 |
| WO | 2020092542 A1 | 5/2020 |
| WO | 2021119187 A1 | 7/2021 |

OTHER PUBLICATIONS

Joppe W. Bos et al., "Post-quantum key exchange for the TLS protocol from the ring learning with errors problem", International Association for Cryptologic Research, vol. 20150316:235249, Mar. 17, 2015, pp. 1-28.

International Search Report mailed Aug. 11, 2016, for PCT Application No. PCT/US2016/031055, filed May 5, 2016, five pages.

International Search Report mailed Oct. 9, 2019, for PCT Application No. PCT/US2019/041871, filed Jul. 15, 2019, four pages.

Li et al., "Addressable Metasurfaces for Dynamic Holography and Optical Information Encryption", Jun. 15, 2018, http://advances.sciencemag.org/content/advances/4/6/eaar6768.full.pdf.

The International Search Report and Written Report for the International Application No. PCT/US2020/064099 dated Mar. 16, 2021.

Bywater Films, "Winkk: Emotion to Action." Vimeo, published Oct. 7, 2015 (Retrieved from the Internet Mar. 22, 2021). Internet URL: <https://vimeo.com/141695923> (Year: 2015).

Schiff, Eli, "Unofficial Apple Icon Design Awards." Eli Schiff Blog, published Jan. 5, 2016 (Retrieved from the Internet Mar. 22, 2021), Internet URL: <www.elischiff.com/blog/2016/1/5/apple-icon-design-awards> (Year: 2016).

International Report on Patentability from International Application No. PCT/US2020/064099, mailed on Jun. 23, 2022, 7 pages.

Magoon, Owais, "iOS app." Behance published Sep. 7, 2015 (Retrieved from the Internet Mar. 22, 2021). Internet URL: <https://www.behance.net/gallery/27383661/iOS-app> (Year: 2015).

Tao et al., "Simple Matrix—A Multivariate Public Key Cryptosystem (MPKC) for Encryption" from Finite Field and Their Applications vol. 35, Sep. 2015, pp. 352-368 (Year 2015).

DYNAMIC KEY EXCHANGE FOR MOVING TARGET

CROSS-REFERENCE TO RELATED APPLICATION(S)

This application is a continuation of co-pending U.S. patent application Ser. No. 17/339,839, filed on Jun. 4, 2021, and titled "DYNAMIC KEY EXCHANGE FOR MOVING TARGET," which is hereby incorporated by reference in its entirety for all purposes.

FIELD OF THE INVENTION

The present invention relates to data communication. More specifically, the present invention relates to a secure data communication.

BACKGROUND

A combination of devices becoming smaller and the growth of device connectivity means that communications between the devices cannot use standard communication protocol in some cases.

SUMMARY

Low power devices are able to utilize encryption in communication. Low power devices typically cannot send/receive large amounts of data since sending/receiving more data uses more power. Implementing a dynamic key exchange with a small encrypted payload enables secure communication between the devices. A one-way data stream is implemented. The one-way data stream is able to be encrypted. The dynamic key exchange is able to be used for a moving target.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

In some embodiments, low power devices utilize encryption methods for secure communication. For example, low power encryption is able to involve a key exchange which includes sending and receiving keys. In some embodiments, the key exchange includes sending, receiving and generating random numbers, wherein the keys and random numbers are utilized to solve the equations.

To minimize power usage, instead of performing authentication (e.g., a key exchange) for every packet, the windowing is able to be pushed out. For example, there is a key exchange once every nth packet (e.g., n=50) instead of every packet. The number of packets between each key exchange is able to be any number, while recognizing that the farther apart the key exchange, the less power usage but also a slight decrease in security. In some embodiments, a device is only awake for a short period of time and sleeps for a majority of the time. Additionally, a device is able to turn off as many components as possible that utilize power, and then the device is able to turn on the components when needed.

In some embodiments, an extension of the Bluetooth® protocol is implemented. The Bluetooth® protocol includes sending a signal 2-ways. A first signal is sent from a low power device (e.g., IoT device), and then a signal is sent to the low power device (e.g., received from the sending device). After the low power device sends a signal (e.g., a beacon or other one-way transmission), the low power device listens for a short window/amount of time, and then goes to sleep to conserve power. Therefore, the low power device is asleep for approximately 99.9% of the time. During the short window, it may receive a 3-way handshake (e.g., perform the key exchange).

Figure 1:
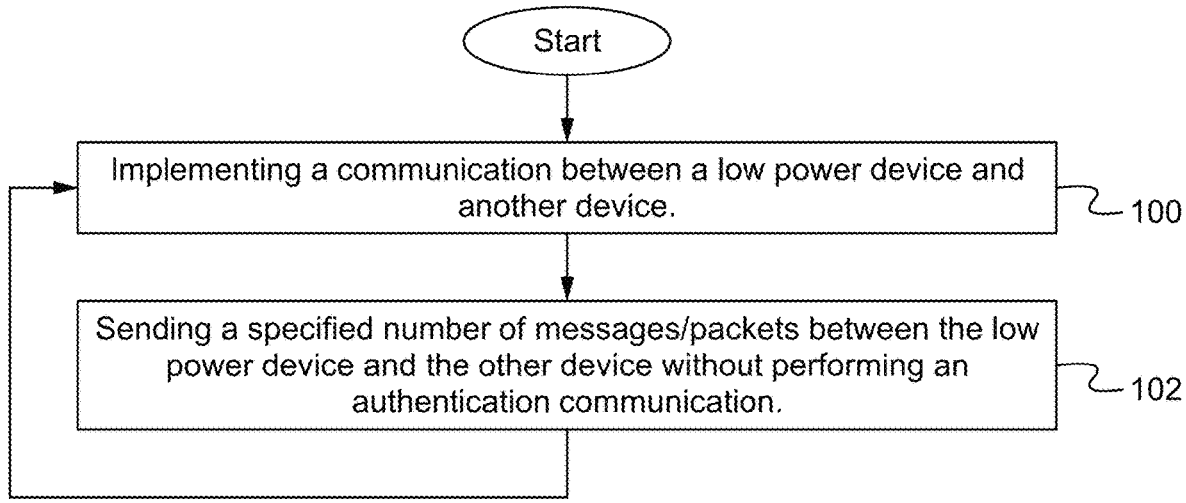
FIG. 1 illustrates a flowchart of a method of implementing low power encryption in motion according to some embodiments.

FIG. 1 illustrates a flowchart of a method of implementing low power encryption in motion according to some embodiments. In the step 100, a matrix-based communication is implemented between a low power device and another device. In some embodiments, the matrix-based communication includes a matrix-based key exchange. In some embodiments, the communication is not matrix-based; rather, another form of communication occurs between the low power device and another device. The low power device is able to be an IoT device and/or any other device which utilizes minimal power. For example, the low power device includes a battery which is charged initially and then is not charged again for many months or self-charges using ambient light and/or signals/waves. In another example, the low power device is powered by a battery or by collecting energy such as WiFi, kinetic vibrations or other ambient sources. The device communicating with the low power device is able to be any device such as a server, a user device, a backend device, or another IoT device. Included with or in addition to the matrix-based communication/key exchange is a message. For example, the low power device and the other device send messages including requests/status information.

As described herein, the matrix-based communication involves real numbers and matrices. Secret information, X, is able to be sent with random number Y (e.g., X+Y) from a first device (e.g., Person A) to a second device (e.g., Person B). Then, a response is sent back from the second device to the first device, another random number Z is included but the secret information, X, is not included in the response, so instead of X+Y+Z, the response is just Y+Z. This is performed using matrices.

$$A = \begin{vmatrix} a_1 & a_2 \\ a_3 & a_4 \end{vmatrix}$$

$$X_i = \begin{vmatrix} x_1 & x_2 \\ x_3 & \frac{x_2 x_3}{x_1} \end{vmatrix}$$

A·X=M, where M is a matrix.
A=X$^{-1}$M.
X is solvable if one knows A and M, but A is not solvable just by knowing X and M.

For example, if Person A sends a message M to Person B and to Person C, where person B has information A and Person C has information M, then Person B has enough information to determine the message, but Person C does not.

Person A sends a function of matrix A and message X (e.g., F (A, X)) to Person B. Message 1 ($M_1$) equals the function, F(A, X). Person B returns back Message 2, $M_2$=F (A, X, B), where B is Matrix B. Person A removes matrix A, and sends Message 3, $M_3$=F(X, B), so that Person B receives the message X. In some embodiments, many more matrices (e.g., 8 or more matrices), more multiplications, and non-linear equations are utilized. Real numbers are utilized instead of integer numbers. Additionally, even if one were to determine Matrices A and B, the equation to solve for X is a diophantine 4$^{th}$ order equation. Therefore, it is not solvable using an algorithmic approach, so brute force must be utilized, which means even a quantum computer would still take many years to decrypt a sufficiently encrypted message.

An authentication system is paired with the matrix-based encryption to ensure security. In the example of Person A exchanging a message X with person B, there is a three way key exchange. Random information (Matrix G) is added to the message, and Matrix G makes no sense even with a brute force attack. Additionally, Person A has his own authentication Matrix $N_1$, and Person B has his own authentication Matrix $N_2$. An authentication system is implemented which utilizes $N_2 \cdot N_1^{-1}$. Additionally, G is included with $N_1$ and $N_2$, so that if a third party attempts to access the information, they receive white noise. In some embodiments, the matrix-based encryption is utilized with RSA and/or ECC to perform quantum tunneling. Even if there is a virus on a device, since the virus is not registered on the authentication system, the virus will receive white noise when trying to access information.

In the step 102, a specified number of messages/packets are sent between the low power device and the other device without performing an authentication communication (e.g., a key exchange). For example, 50 packets are sent before the next matrix-based key exchange. A counter is able to be utilized to determine when to perform the next matrix-based messaging/key exchange. In some embodiments, a clock is utilized to determine when to perform the next matrix-based messaging/key exchange.

In some embodiments, fewer or additional steps are implemented. In some embodiments, the order of the steps is modified.

Figure 2:
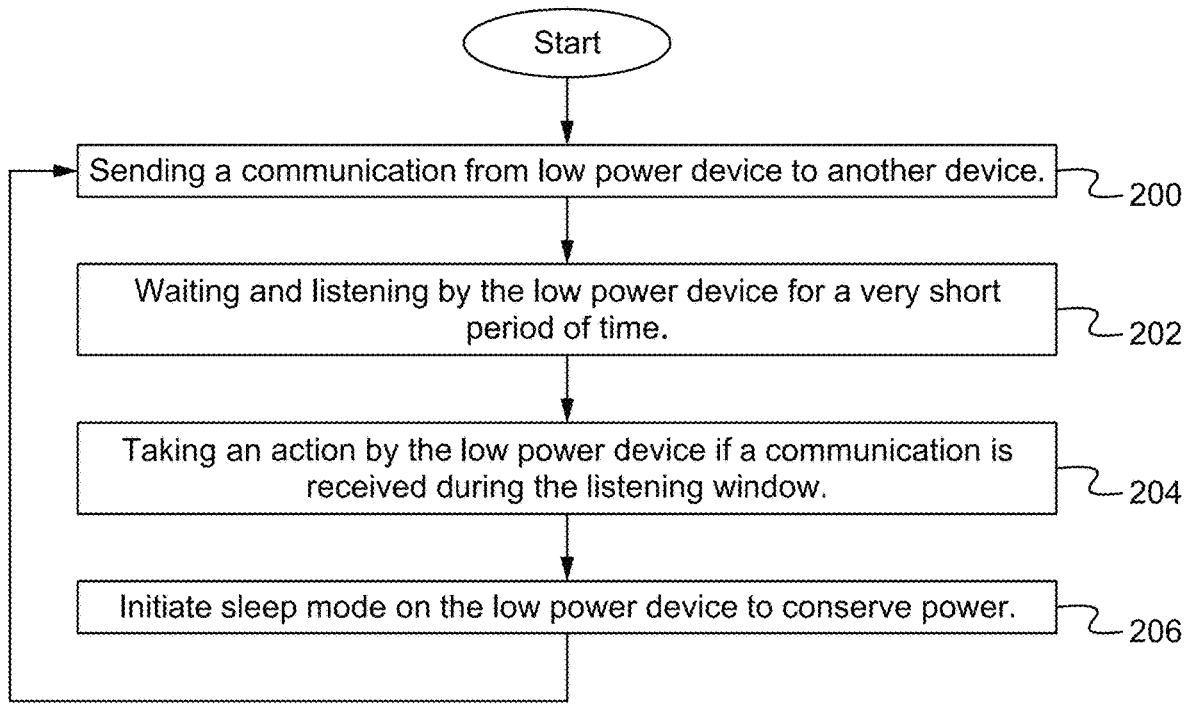
FIG. 2 illustrates a flowchart of another method of implementing low power encryption in motion according to some embodiments.

FIG. 2 illustrates a flowchart of another method of implementing low power encryption in motion according to some embodiments. In the step 200, a low power device sends a communication (e.g., signal) to another device. In some embodiments, the communication is a matrix-based communication as described herein.

In the step 202, the low power device waits and listens for a very short period of time (e.g., 1 second, 5 seconds, 5 minutes). While waiting and listening, the low power device is using power (e.g., to power the receiver).

In the step 204, if a communication is received during the listening window, the low power device takes an action. For example, the low power device and the other device may perform the matrix-based key exchange described herein. In another example, the low power device may be a sensor, and if another device sends a status request, the low power device may respond with status information after the matrix-based key exchange.

In the step 206, the low power device goes into sleep mode to conserve power. After the awake period or after an action is taken, the low power device enters sleep mode. The process repeats after a while by going back to step 200. For example, the low power device uses its internal clock or other mechanism to determine when to wake up and send another communication. By being in sleep most of the time (e.g., 99.9% of the time), the low power device significantly reduces its power consumption. In some embodiments, fewer or additional steps are implemented. For example, a low power device is configured and implemented to utilize less power such as by turning off certain components when not in use and by utilizing special sensors and power capturing/charging components configured to charge the low power device's battery. In some embodiments, the order of the steps is modified.

In some embodiments, the low power encryption in motion methods are utilized together. For example, the low power device sends a signal and waits/listens for a response during a short window, but only every nth window is there a key exchange. In this case since the window occurs infrequently, the nth window may be a lower number such as every 10$^{th}$ time, although any number could be specified.

Key Exchange with Small Encrypted Payload

In some embodiments, low power devices utilize the matrix encryption methods described herein for encryption. Low power devices typically cannot send/receive large amounts of data since sending/receiving more data uses more power.

A communication device sends a signal/message (e.g., beacon) to a low power device (e.g., IoT device, credit card). In addition to or included with the message, the communication device is able to send a small amount of data (e.g., 20 bytes). For example, the message as a total (including keys, equations) is 20 bytes or fewer, or the message has a size limit, and the additional information (e.g., keys, equations) has a different size limit (e.g., 20 bytes). In some embodiments, the communication comprises a payload as small as 20 bytes or fewer. The payload size is able to be modified depending on a specification such as a Power Specification. There are multiple keys (e.g., $k_1$, $k_2$) at the communication device and multiple keys (e.g., $k_1$, $k_2$) at the low power device. The communication device and the low power device each have real number random number generators. Using the random number generators, one or more random numbers between 0 and 1 are able to be generated. Each random number is 4 bytes, so for 2 random numbers, there is a total of 8 bytes used. The following shows exemplary equations:

$$r_1(1-k_1) + r_2 k_1 = m_1$$
$$r_1(1-k_2) + r_2 k_2 = m_2$$
$$r_1(1-x) + r_2 x = m_3$$
$$x = \frac{[m_3 - r_1]}{r_2 - r_1}$$

where x is the message;

$k_1$ and $k_2$ are keys;

$r_1$ and $r_2$ are randomly generated numbers; and $m_1$, $m_2$ and $m_3$ are real numbers between 0 and 1 calculated using the keys and randomly generated numbers. Additionally, $m_1$, $m_2$ and $m_3$ are functionally unrelated, such that if someone snoops and retrieves the values of $m_1$, $m_2$ and $m_3$, the snooper retrieves garbage data or white noise even if x is constant.

For example, the communication device sends the equations for $m_1$ and $m_2$, which are each 4 bytes, to the low power device. The communication device also sends the message or the equation for m 3 (which includes the message) which is also 4 bytes (meaning a total of 12 bytes for the 3 equations). The variables $r_1$ and $r_2$ are unknown by any third party. The variables $r_1$ and $r_2$ are then able to be determined/calculated by the low power device. In some embodiments, $r_1$ and $r_2$ are received by the low power device. The value/information of x (the message) is able to be decrypted by the low power device using $r_1$ and $r_2$ and the equations.

Figure 3:
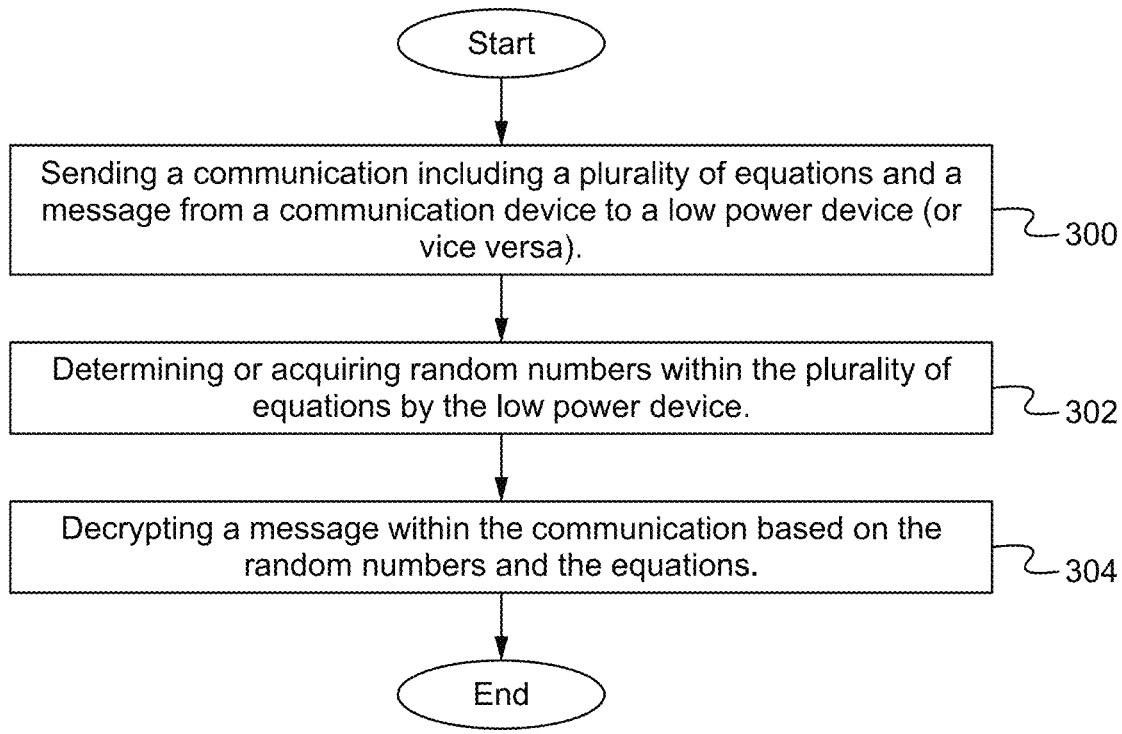
FIG. 3 illustrates a flowchart of a method of implementing low power encryption in motion according to some embodiments.

FIG. 3 illustrates a flowchart of a method of implementing low power encryption in motion according to some embodiments. In the step 300, a communication is sent from a communication device to a low power device (or vice versa). The communication includes an encrypted message. In some embodiments, the communication includes a plurality of equations. In some embodiments, the communication is limited in size (e.g., less than 20 bytes). The communication includes information that changes each communication such as a session identification number, a date/time stamp, and/or any other information to prevent a third party from capturing/copying a communication and sending the captured transmission. For example, the communication includes an identifier which counts up (e.g., for every package or is time-based), so that if the identifier is the same as or below a previous identifier, then the device knows that the communication is a duplicate, and is able to reject the communication and/or not respond.

In the step 302, random numbers within the plurality of equations are determined or acquired by the low power device. The random numbers are real numbers between 0 and 1, although other real numbers are able to be used. In some embodiments, the random numbers are received via the communication. In some embodiments, the random numbers are generated based on the communication using the random number generator on the low power device.

In the step 304, a message within the communication is decrypted. In some embodiments, the decryption is based on the random numbers and the equations as described herein. In some embodiments, fewer or additional steps are implemented. For example, the communication is able to be implemented without random numbers. In some embodiments, the order of the steps is modified.

Figure 4:
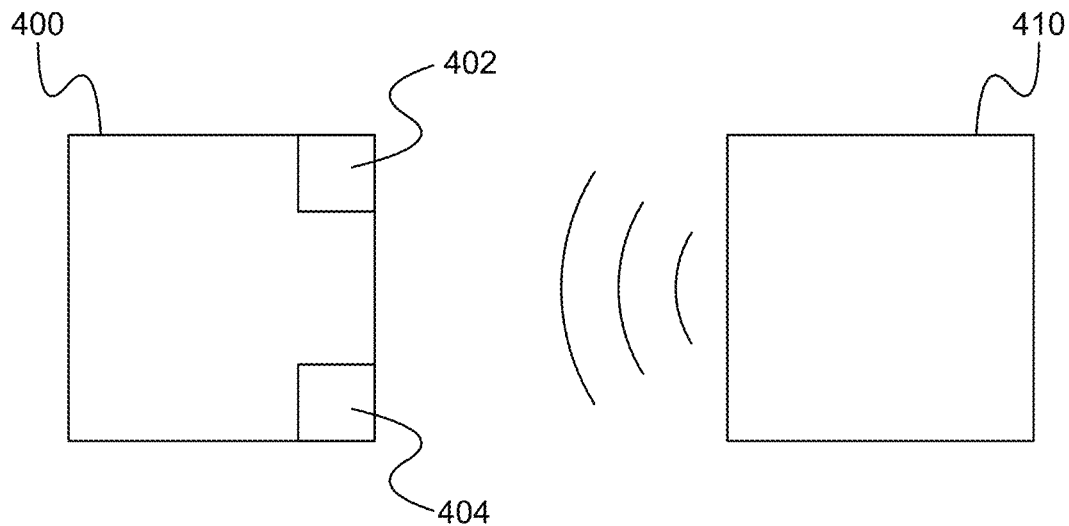
FIG. 4 illustrates a diagram of a low power device in a communication system according to some embodiments.

FIG. 4 illustrates a diagram of a low power device in a communication system according to some embodiments. The low power device 400 includes a transmitter/receiver 402 (e.g., an antenna) to receive communications. The low power device 400 is also able to include other components 404 such as a battery (e.g., Lithium ion), one or more sensors, a processing unit, memory (e.g., RAM), one or more charging components (e.g., a small photovoltaic cell, a vibration converter) and other computing components. The one or more charging components are able to charge the battery using very small amounts of energy from energy sources such as ambient light, tiny vibrations, or wireless signals. The battery (along with the charging components) are configured such that the battery is able to be charged once and then maintain that charge for many months. The low power device 400 is able to send/receive a communication (e.g., one-way communication/data stream/beacon) as described herein. In some embodiments, the low power device 400 sends a communication periodically (e.g., once every 20 minutes). The communication is able to be RF, infrared, WiFi, Bluetooth, 5G (xG), or any other wireless communication. The low power device 400 is able to communicate with any device 410 (e.g., a mobile device, a server, another IoT device). In some embodiments, the low power device 400 includes fewer or additional components.

Encryption for One-way Data Stream

In some embodiments, encryption for a one-way data stream is implemented. In some embodiments, as a device is provisioned, the two-way exchange (e.g., two handshakes) with a second device is able to be implemented. Then, since the two-way exchange with the second device has already occurred, the device is able to send one-way data streams to the second device. The one-way data stream is able to be a broadcast, cyphereye data, Bluetooth®, stream, coordinate information, and/or any other data.

Figure 5:
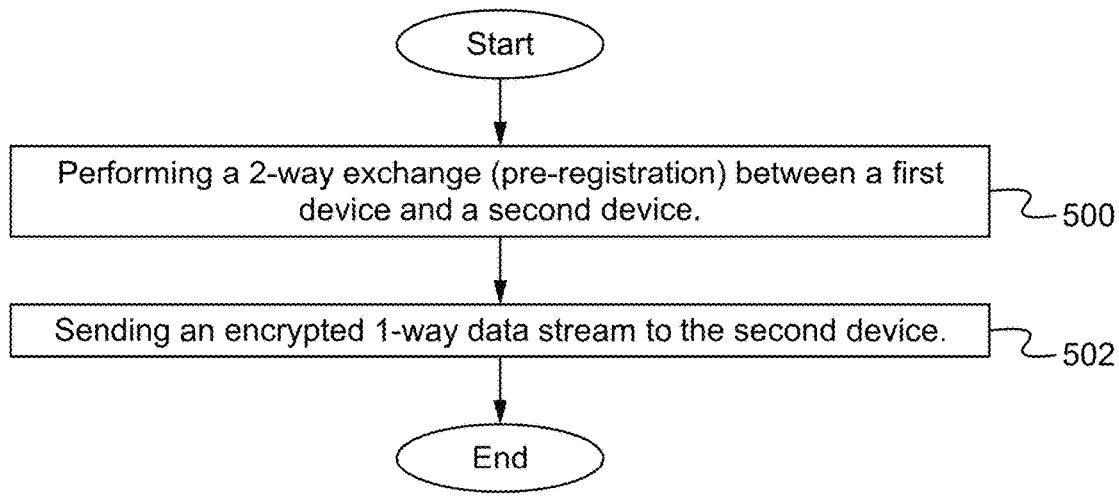
FIG. 5 illustrates a diagram of a 1-way data stream encryption according to some embodiments.

FIG. 5 illustrates a diagram of a one-way data stream encryption according to some embodiments. In the step 500, a two-way exchange (pre-registration) occurs between two devices (e.g., client and server). For example, the matrix-based exchange described herein occurs between a first device and a second device. After the two-way exchange is performed, a device is able to send an encrypted one-way data stream to the second device, in the step 502. Since the pre-registration has established authentication/encryption credentials/information between the devices, the encrypted one-way data stream is able to be decrypted by the second device, while being securely transmitted. In some embodiments, the one-way data steam is from a mobile device, server, or other device to an Internet of Things device (or vice versa). In some embodiments, the one-way data stream is status information (e.g., status of a sensor chip to a central station). In some embodiments, the one-way-data stream includes instructions (e.g., from a central device to an IoT device to perform a specific type of monitoring or to go into a certain state/mode such as to go to sleep). In some embodiments, fewer or additional steps are implemented. In some embodiments, the order of the steps is modified.

Dynamic Key Exchange for Moving Target

In some embodiments, a dynamic, key exchange for a moving target is implemented. For example, a client (e.g., mobile device, autonomous vehicle) is moving and keeps switching between servers/receivers (e.g., devices positioned on light/telephone poles). In some embodiments, the key exchange is matrix-based. In some embodiments, a dynamic key exchange registration is implemented where each time the signal drops at one receiver, the device connects with another receiver and performs another key exchange. In some embodiments, the device and/or receivers are pre-registered with an authentication server. In some embodiments, the device and/or receivers are registered (or pre-registered) with an authorization server, where the authorization server performs the processing and is able to send a decrypted message (based on an encrypted message from a receiver) to the device which forwards the message to another receiver (e.g., the server on the light pole), or the decrypted message is based on an encrypted message from a device, and the decrypted message is sent to the receiver. The receivers are able to send a one-way data stream (e.g., beacon) to the moving device (or vice versa). In some embodiments, the device and/or receivers send a matrix-based encrypted communication to the receiver/device which forwards the communication to the authentication server which performs the decryption.

Figure 6:
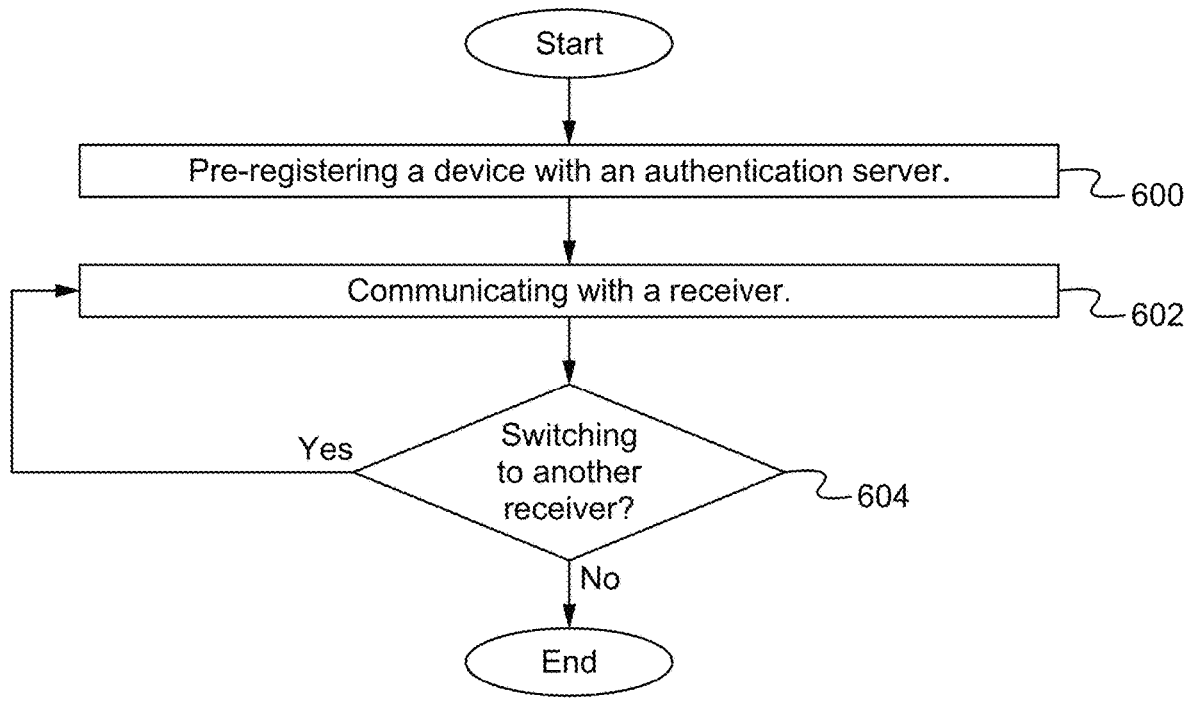
FIG. 6 illustrates a flowchart of a method of performing a dynamic key exchange for a moving target according to some embodiments.

FIG. 6 illustrates a flowchart of a method of performing a dynamic key exchange for a moving target according to some embodiments. In the step 600, a device is pre-registered with an authentication server. For example, the pre-registration described herein is implemented. In another example, pre-registration includes storing/recording device information (e.g., MAC address or other identification information) at the authentication server, so that the authentication server already "knows" the device. In some embodiments, other matrix-based encryption information is utilized for pre-registration. Similarly, the receiver is able to be pre-registered or registered with the authentication server. A pre-registered key or a dynamically-generated key is able to be used with the secure key exchange.

In the step 602, the device communicates with a receiver. The communication is able to include a communication from the device to the receiver, a communication from the receiver to the device, or a combination thereof. Initially, a dynamic, key exchange between the device and the receiver is implemented as described herein. In some embodiments, each time the device switches to a new receiver, the dynamic key exchange is performed again. In some embodiments, the authentication server is able to assist with the dynamic key exchange between the device and the receiver. For example, the authentication server assists with the authentication by performing the key exchange computations and then provides the result to the device and/or the receiver. In another example, the authentication sever is able to perform the authentication with the device and/or the receivers such that the key exchange does not occur each time the device switches to a new receiver. In another example, the authentication server is able to store data to expedite the dynamic key exchange between the device and the receivers. Furthering the last example, if a device and/or receiver is verified or "known" by the authentication server, the authentication process/dynamic key exchange is able to be skipped or expedited. In some embodiments, the receiver forwards dynamic key information received from the device to the authentication server, and the authentication server performs the key analysis (e.g., matrix multiplication) to provide authentication data to the receiver and/or the device. Furthering the example, the device sends an encrypted communication to the receiver, but the receiver does not decrypt the communication; the receiver forwards the encrypted communication to the authentication server which performs the decryption, and then takes another action such as returning the decrypted message to the receiver. After the device and/or receiver perform the dynamic key exchange, the message and/or messages are able to be acted upon. For example, if the dynamic key exchange accompanies a status request, a receiver is able to send a message back to the device with the status of the receiver. In another example, the messages to the receiver are able to include commands for the receiver to take a specified action. Similarly, the receiver is able to send commands to the device, and the device will take a specified action.

In the step 604, the device determines whether to switch to another receiver. Determining when and whether to switch to another receiver is able to be implemented in any manner such as detecting that an ACK has not been received in response to a communication with the receiver, detecting a low signal strength from a receiver, utilizing a zone mapping which indicates which receiver services which zone, and/or any other manner. In some embodiments, when the device determines to switch to another receiver, the process resumes at the step 602 to perform an authentication such as a dynamic key exchange. In some embodiments, the device does not determine whether to switch to a new receiver, and instead, the device broadcasts a communication, and whatever receiver is nearby receives the communication. The communication is encrypted as described herein, so receiver that receives the communication will still perform decryption. Similarly, the device is able to receive a communication from whichever receiver is nearby. In some embodiments, fewer or additional steps are implemented. In some embodiments, the order of the steps is modified.

Figure 7:
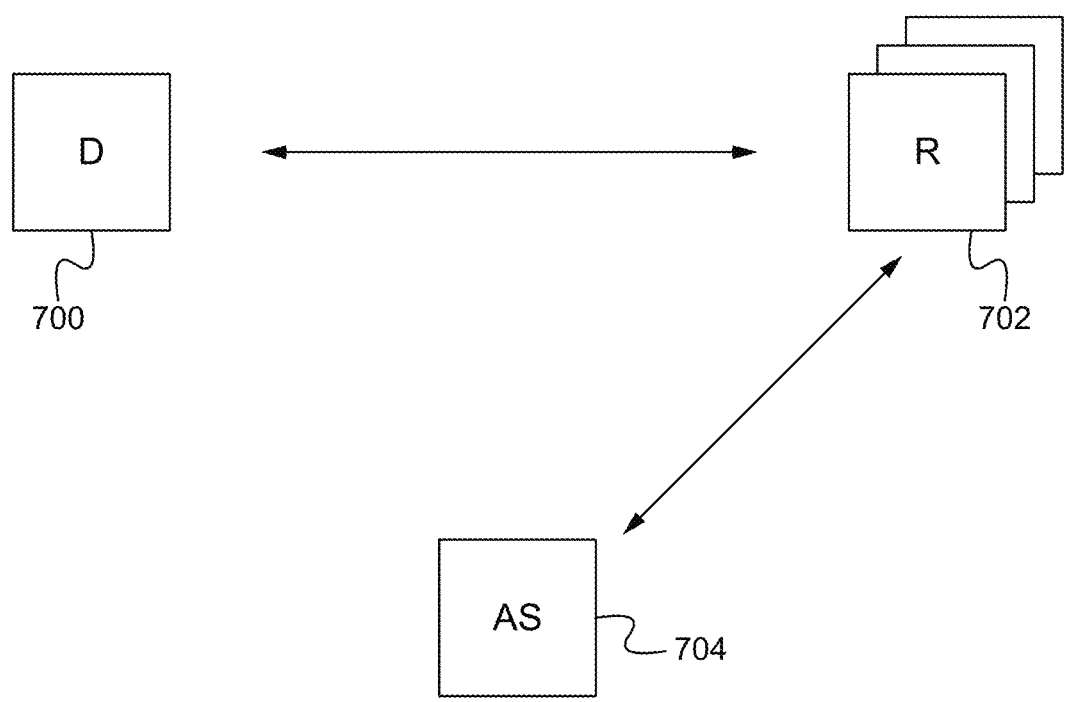
FIG. 7 illustrates a diagram of a system for implementing a dynamic key exchange for a moving target according to some embodiments.

FIG. 7 illustrates a diagram of a system for implementing a dynamic key exchange for a moving target according to some embodiments. A device 700 communicates with a set of receivers 702. The device 700 is able to be any device such as a mobile phone, an autonomous vehicle, an IoT device, a server or others. The receivers 702 are able to be any device such as a mobile phone, an autonomous vehicle, a server, an IoT device, or others. An authentication server 704 is able to be used to authenticate (or pre-authenticate) the device 700 and/or the receivers 702. In some embodiments, the authentication server 704 is able to be used to authenticate (or pre-authenticate) the communication to/from the device 700. In some embodiments, the device 700 is able to communicate with the authentication server 704, and/or the set of receivers 702 are able to communicate with the authentication server 704. The communication between each of the devices (e.g., device 700, receivers 702 and authentication server 704) is able to be any implementation such as WiFi, cellular, 5G/xG, Bluetooth, and/or any combination thereof. The authentication server 704 is able to be located anywhere such as at a central location.

In some embodiments, the device 700 and/or the set of receivers 702 are pre-registered with an authentication server 704. Any form of pre-registration is able to be implemented. While the device 700 is moving, the device 700 will connect/communicate with several of the set of receivers 702. The communication between the device 700 and the set of receivers 702 is secure. In some embodiments, the key exchange is implemented each time the device 700 connects with a receiver 702. In some embodiments, the authentication sever 704 performs the key exchange by receiving the communication and accompanying matrix/encryption information, and provides access for the receiver 702. For example, the device 700 attempts to connect with a receiver 702, so the key exchange is implemented. The receiver 702 passes the information to the authentication server 704, which performs the processing (e.g., matrix multiplication), and provides the key information back to the receiver 702 and/or the device 700, so that the device 700 and the receiver 702 are able to communicate. In some embodiments, the authentication server 704 is able to use the pre-registration information to bypass security protocols and/or to be utilized with the key exchange. As the device 700 moves and leaves range/signal of the receiver, the device 700 communicates with another receiver in the set of receivers 702. The key exchange occurs with the other receiver, and so on with additional receivers. As described herein, determining when to switch to another receiver is able to be performed in any manner such as by detecting when a signal, quality of service, and/or speed of another receiver is higher than the current receiver, detecting when a distance of another receiver is lower than the current receiver, and others.

Figure 8:
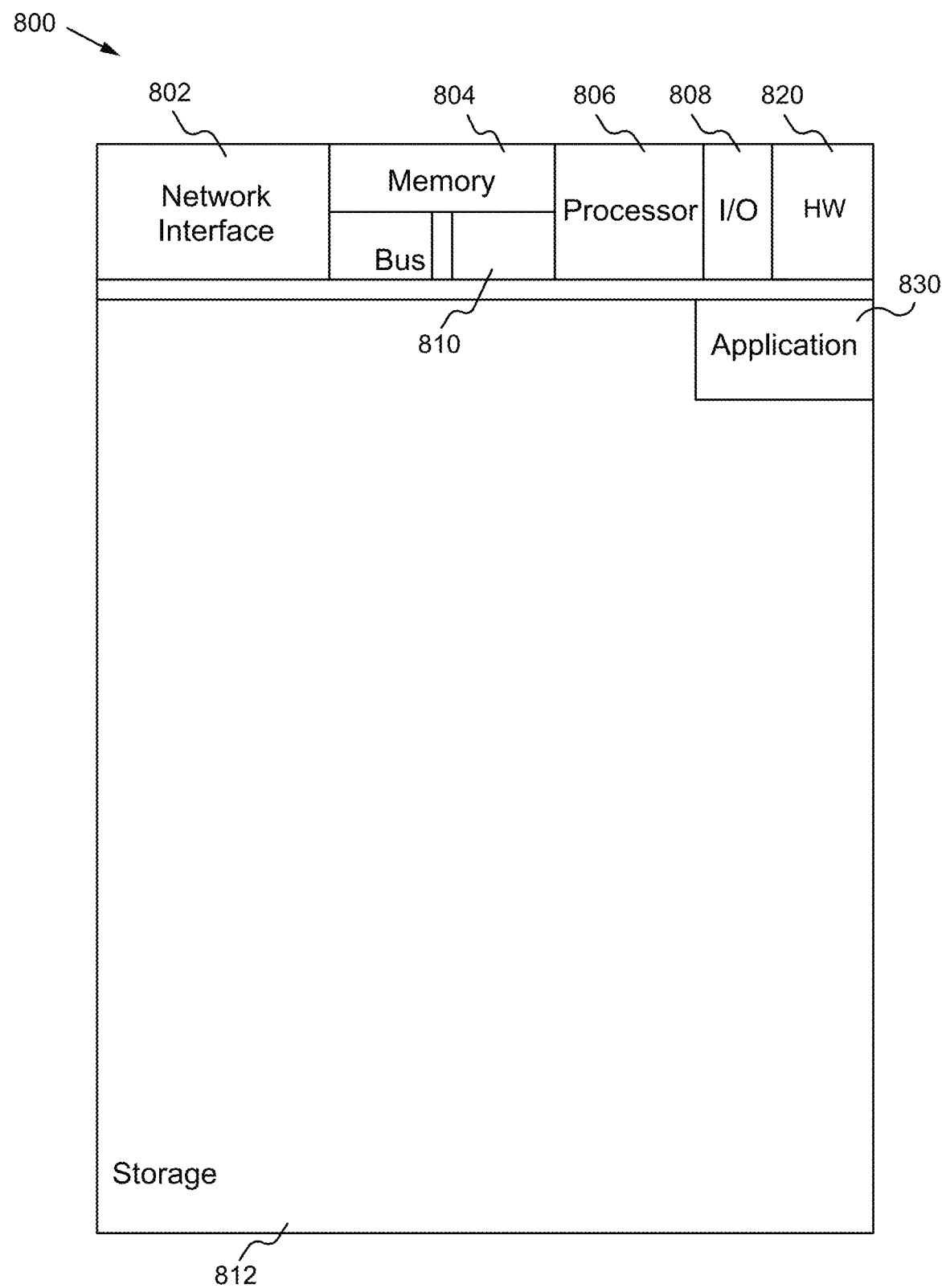
FIG. 8 illustrates a block diagram of an exemplary computing device configured to implement the dynamic key exchange method according to some embodiments.

FIG. 8 illustrates a block diagram of an exemplary computing device configured to implement the dynamic key exchange method according to some embodiments. The computing device 800 is able to be used to send, receive, acquire, store, compute, process, communicate and/or display information. The computing device 800 is able to implement any of the encoding/decoding aspects. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. A GPU is also able to be included. The memory 804 is able to be any conventional computer memory known in the art. The storage device 812 is able to include a hard drive, CDROM, CDRW, DVD, DVDRW, High Definition disc/drive, ultra-HD drive, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, screen, printer, modem, touchscreen, button interface and other devices. Key exchange application(s) 830 used to implement the key exchange method are likely to be stored in the storage device 812 and memory 804 and processed as applications are typically processed. More or fewer components shown in FIG. 8 are able to be included in the computing device 800. In some embodiments, key exchange hardware 820 is included. Although the computing device 800 in FIG. 8 includes applications 830 and hardware 820 for the key exchange implementation, the key exchange method is able to be implemented on a computing device in hardware, firmware, software or any combination thereof. For example, in some embodiments, the key exchange applications 830 are programmed in a memory and executed using a processor. In another example, in some embodiments, the key exchange hardware 820 is programmed hardware logic including gates specifically designed to implement the key exchange method.

In some embodiments, the key exchange application(s) 830 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle), a drone, or any other suitable computing device.

Any of the implementations described herein are able to be used with any of the other implementations described herein. In some embodiments, the implementations described herein are implemented on a single device (e.g., user device, IoT device, server, cloud device, backend device) and in some embodiments, the implementations are distributed across multiple devices, or a combination thereof.

The embodiments described herein can be implemented by either a method or process or as a system or device. The method can be performed using any suitable computing device, and the system can be embodied as any suitable computing device. The computing device can include at least one processing system, for example, having one or more processors and memories electrically and communicatively coupled together using a local interface. The local interface can be embodied as a data bus with an accompanying address/control bus or other addressing, control, and/or command lines.

In various embodiments, the memory can store data and software or executable code components executable by the processor. For example, the memory can store executable-code components associated with cryptographic operations for execution by the processor. The software or executable-code components can be developed using or embodied in various programming languages, such as, for example, C, C++, C#, Objective C, JAVA®, JAVASCRIPT®, Perl, PHP, VISUAL BASIC®, PYTHON®, RUBY, FLASH®, or other programming languages.

The embodiments can rely, in part, on executable instructions or instructions for execution by the computing device. The terms "executable" or "for execution" refer to software forms that can ultimately be run or executed by a processor, whether in source, object, machine, or other form. Examples of executable programs include, for example, a compiled program that can be translated into a machine code format and loaded into a random access portion of memory and executed by a processor, source code that can be expressed in an object code format and loaded into a random access portion of the memory and executed by the processor, or source code that can be interpreted by another executable program to generate instructions in a random access portion of the memory and executed by the processor, etc.

An executable program can be stored in any portion or component of the memory including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD)) or digital versatile disc (DVD)), floppy disk, magnetic tape, or other memory component.

Although the processes shown in Figures illustrate a certain order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any algorithm, method, process, or logic described herein that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in the Figures. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

I claim:

1. A method comprising:
performing a key exchange between a device and each receiver of a plurality of receivers; and
sending, with the device, a communication to each receiver of the plurality of receivers, wherein the device is configured to switch to a receiver of the plurality of receivers based on movement of the device, further wherein the key exchange between the device and the receiver of the plurality of receivers occurs when a second speed of the receiver of the plurality of receivers is greater than a first speed of a previous receiver of the plurality of receivers.

2. The method of claim 1 further comprising pre-registering, or dynamically registering with a secure key exchange, the device and/or the plurality of receivers with an authentication server.

3. The method of claim 2 wherein performing the key exchange utilizes the authentication server.

4. The method of claim 3 wherein the authentication server is configured to perform computations to perform the key exchange.

5. The method of claim 4 wherein performing the computations includes sending a decrypted communication to the receiver.

6. The method of claim 2 wherein pre-registering the device and/or the plurality of receivers with the authentication server includes storing device identification information.

7. The method of claim 1 wherein the key exchange between the device and a receiver of the plurality of receivers occurs when a signal between the device and the receiver is above a threshold.

8. The method of claim 1 wherein the device comprises a mobile phone, an autonomous vehicle, or an Internet of Things device.

9. A server device comprising:
a memory for storing an application, the application configured for:
pre-registering, or dynamically registering with a secure key exchange, a device and/or a plurality of receivers;
assisting with performing a key exchange between the device and each receiver of a plurality of receivers, further wherein the key exchange between the device and the receiver of the plurality of receivers occurs when a second speed of the receiver of the plurality of receivers is greater than a first speed of a previous receiver of the plurality of receivers; and
sending decryption information to each receiver of the plurality of receivers; and
a processor configured for processing the application.

10. The server device of claim 9 wherein the application is further configured to perform computations to perform the key exchange.

11. The server device of claim 10 wherein the application is further configured to send a decrypted communication to the device and/or a receiver of the plurality of receivers.

12. The server device of claim 9 wherein pre-registering the device and/or the plurality of receivers includes storing device identification information.

13. The server device of claim 9 wherein the key exchange between the device and a receiver of the plurality of receivers occurs when a signal between the device and a receiver of the plurality of receivers.

14. A system comprising:
a plurality of receivers;
a device configured for sending a communication to each receiver of the plurality of receivers, wherein the device is configured to switch to a receiver of the plurality of receivers based on movement of the device, wherein sending the communication includes performing a key exchange; and
an authentication server configured for performing computations to perform the key exchange, further wherein the key exchange between the device and the receiver of the plurality of receivers occurs when a second speed of the receiver of the plurality of receivers is greater than a first speed of a previous receiver of the plurality of receivers.

15. The system of claim 14 wherein the authentication server is configured for pre-registering, or dynamically registering with a secure key exchange, the device and/or the plurality of receivers.

16. The system of claim 15 wherein pre-registering the device and/or the plurality of receivers with the authentication server includes storing device identification information.

17. The system of claim 14 wherein performing the computations includes sending a decrypted communication from the authentication server to the receiver.

18. The system of claim 14 wherein the key exchange between the device and a receiver of the plurality of receivers occurs when a signal between the device and the receiver is above a threshold.

19. The system of claim 14 wherein the device comprises a mobile phone, an autonomous vehicle, or an Internet of Things device.

20. The system of claim 14 wherein each of the plurality of receivers is stationary.

* * * * *